United States Patent [19]
Wosnitza et al.

[11] Patent Number: 5,366,673
[45] Date of Patent: Nov. 22, 1994

[54] METHOD OF AUTOCLAVING POROUS PIECE-GOODS ESPECIALLY MOULDED BODIES OF POROUS CONCRETE

[75] Inventors: Franz Wosnitza, Aachen, Germany; Georg Beckmann, Vienna, Austria; Georg Zimmermann, Aachen, Germany

[73] Assignees: Hebel Aktiengesellschaft, Emmering; SICOWA Verfahrenstechnik fuer Baustoffe GmbH & Co. KG, Aachen, both of Germany

[21] Appl. No.: 963,983

[22] Filed: Oct. 20, 1992

[30] Foreign Application Priority Data

Oct. 24, 1991 [DE] Germany ............................ 4135119

[51] Int. Cl.⁵ ................................................ F26B 3/00
[52] U.S. Cl. ........................................ 264/37; 264/234; 264/33; 264/344; 264/345; 264/DIG. 43
[58] Field of Search ................ 264/DIG. 43, 297.9, 264/37, 82, 333, 86, 87, 234, 345, 40.1, 344; 425/DIG. 117, DIG. 118, DIG. 202, 452, 253–255; 34/86, 35

[56] References Cited

U.S. PATENT DOCUMENTS

| | | | |
|---|---|---|---|
| 683,337 | 9/1901 | Schulthess | 264/345 |
| 761,042 | 5/1904 | Gathmann | 34/77 |
| 3,231,657 | 1/1966 | Kalousek | 264/345 |
| 3,275,724 | 9/1966 | Klingel | 264/81 |
| 3,535,407 | 10/1970 | Pike | 264/37 |
| 4,132,590 | 1/1979 | Yamada et al. | 264/333 X |
| 4,272,894 | 6/1981 | Salviati | 264/234 X |
| 4,388,257 | 6/1983 | Oguri et al. | 264/82 |
| 4,531,304 | 7/1985 | Wauhop, Jr. et al. | 264/37 X |
| 4,560,346 | 12/1985 | Schulz | |
| 4,570,443 | 2/1986 | Specht | |
| 4,734,163 | 3/1988 | Eberhardt et al. | 264/82 X |

FOREIGN PATENT DOCUMENTS

| | | | |
|---|---|---|---|
| 3210695 | 9/1983 | Germany | 264/333 |
| 3227097 | 1/1984 | Germany | |
| 386878 | 10/1973 | U.S.S.R. | 264/DIG. 43 |
| 806656 | 2/1981 | U.S.S.R. | 264/345 |
| 1038326 | 8/1983 | U.S.S.R. | 264/333 |

*Primary Examiner*—Karen Aftergut
*Attorney, Agent, or Firm*—Flynn, Thiel, Boutell & Tanis

[57] ABSTRACT

A method of autoclaving porous piece-goods, by steam under pressure, wherein the autoclaving operation includes sequential phases of heating with steam, holding, and then relaxing the pressure and temperature, wherein the holding phase includes a drying process. In order to obtain as dry a product as possible with the smallest possible energy input, it is provided that a drying process is carried out within the holding phase in which the autoclave is heated more than to compensate for heat losses and to a temperature above the temperature of vaporization of the water so that the material is dried by controlled discharge of steam from the interior of the autoclave. The steam discharged from one or more autoclaves during the drying process is used to heat up at least partially an autoclave to be heated.

7 Claims, 3 Drawing Sheets

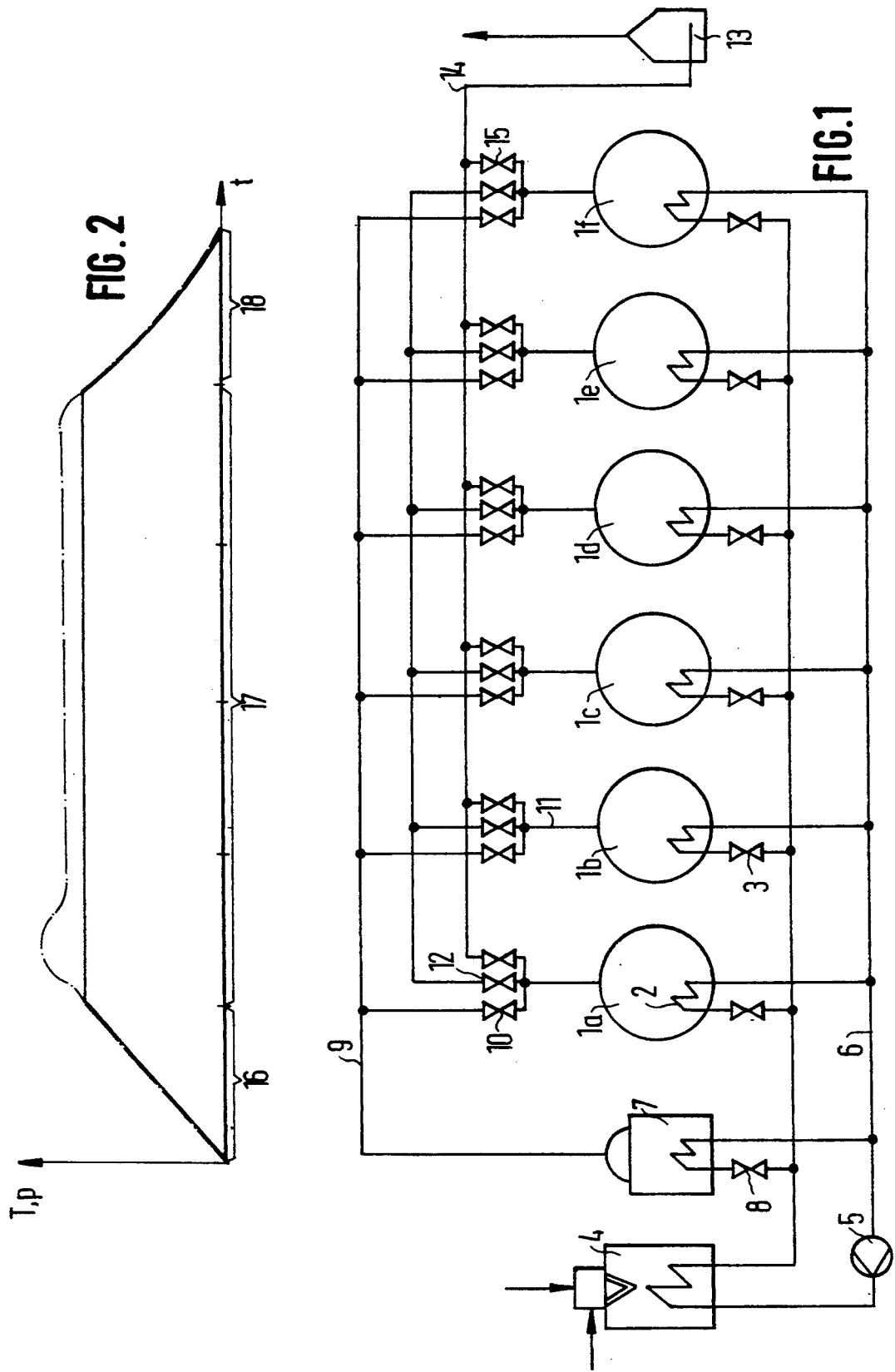

METHOD OF AUTOCLAVING POROUS PIECE-GOODS ESPECIALLY MOULDED BODIES OF POROUS CONCRETE

FIELD OF THE INVENTION

This invention relates to a method of autoclaving porous piece-goods, by means of steam under pressure, especially moulded bodies of porous concrete, in which water in excess of a stoichiometric amount is present initially or in which water is released in the course of the autoclaving, wherein the autoclaving operation comprises sequential phases of heating with steam, holding and relaxing the pressure and temperature, as well as a drying process, in which the autoclave is additionally heated indirectly more than to compensate for heat losses and to a temperature above the temperature of vaporisation of the water so that the material is dried by controlled discharge from the interior of the autoclave of steam resulting from the heat input in the drying process.

BACKGROUND OF THE INVENTION

Such a method is known from EP-B 0 133 239, in which pressure and temperature are held constant during the holding phase, in order to allow the desired reaction to proceed during this time. There then follows a drying process in an intermediate phase, during which the autoclave is additionally heated more than to compensate for heat losses and to a temperature above the temperature of vaporisation of the water, so that excess water in the goods is partially vaporised and discharged as steam, in order to obtain a dry product at the end of the autoclave cycle. However, primary energy is used in this both for the heating up and for holding and drying—this involving a corresponding additional invested expense.

The object of the invention is to teach a method of the kind initially referred to, which makes it possible to carry out the drying process without taking up additional time and without the contribution of additional primary energy.

SUMMARY OF THE INVENTION

This object is met in that the drying operation is carried out within the holding phase, while the steam discharged from one or more autoclaves during the drying process is used to heat up at least partially an autoclave to be heated.

In this novel method, additional heat is already introduced to the interior of the autoclave in the holding phase by indirect heating, in an amount which substantially exceeds the amount of heat required to compensate for the heat losses of the autoclave. Through this the temperature of the steam in the autoclave rises, without new steam being introduced to the autoclave from outside, which means that the steam in the autoclave is superheated. Because of the superheated steam, the water in the goods to be autoclaved begins to vaporise. The heat of vaporisation needed for this leads to "chilling" of the superheated steam. This contracts, creates a falling natural convection in the goods, draws out therewith the vaporised water from the surface of the goods and constantly increases the internal pressure in the autoclave. A pressure regulated discharge valve allows the "cooled" superheated steam to discharge from the autoclave, until the working pressure in the autoclave has been regained. The discharge valve can however also maintain the working pressure in the autoclave constant by constant regulation. The drying process effected by superheating the steam in the autoclave and by discharging superheated steam with water vaporised from the hardened goods can be continued to the end of the holding phase. It is however crucial that the drying process is carried out by suitably increased heat supply during the holding phase and not, as in the method initially referred to, in an intermediate phase located between the holding phase and the relaxing phase. Since the drying process is integrated into the holding phase, the drying process requires no additional time. Since moreover the steam taken off from one or more autoclaves in the drying process is used to heat up an autoclave to be heated, so that the energy needed for the heating up is not required, the drying process can be carried out without additional primary energy.

Advantageously, a plurality of autoclaves are operated in the steam circuit, their autoclave cycles being so offset relative to one another that, steam discharged from the holding phase of one or more autoclaves during the drying process is fed to heat up at least one of the autoclaves in the heating phase.

Those autoclaves whose cycles are in the holding and accordingly drying phase, thereby give off as much steam as is required as primary steam by a freshly laden, cold, un-pressurised autoclave to be heated up. The autoclaves in the holding phase act for the start-up autoclave as steam generators by means of which steam is made from make-up water, which is found in the product itself, or secondary water which is released during the autoclaving, and condensate, which is produced by heating up steam condensing on the goods and then penetrating the porous goods as condensate.

Moulded bodies of components containing binders, say porous concrete, calcium silicate blocks or the like, are made as cold-pressed mouldings with water in excess of a stoichiometric amount. Moreover the steam condensing on the surfaces of the initially cold moulded bodies while heating up the autoclave is sucked up. The latter occurs also when autoclaving calcium sulphate beta hemi-hydrate for making calcium sulphate alpha hemi-hydrate, in which process water of crystallisation additional to moisture initially present is released during the recrystallisation. Since the drying process is carried out within the holding phase, low degrees of moisture are obtained in the product leaving the autoclave, without additional expenditure of time and without additional primary energy. Because of the indirect heating during the drying process, there are no surfaces embrittled by radiant heat.

The heat source, especially a heating oil heater needs to be designed only to heat up a single autoclave, in order to be able to undertake initial heating up with cold autoclaves.

Further advantageous developments of the invention are to be found in the dependent claims and the following description.

BRIEF DESCRIPTION OF THE DRAWINGS

The invention will now be explained in more detail, with reference to the embodiment shown in the accompanying drawings.

FIG. 1 shows an autoclave plant schematically, for carrying out the method.

FIG. 2 is a diagram relating to the autoclave cycle.

DETAILED DESCRIPTION

Figure 3:
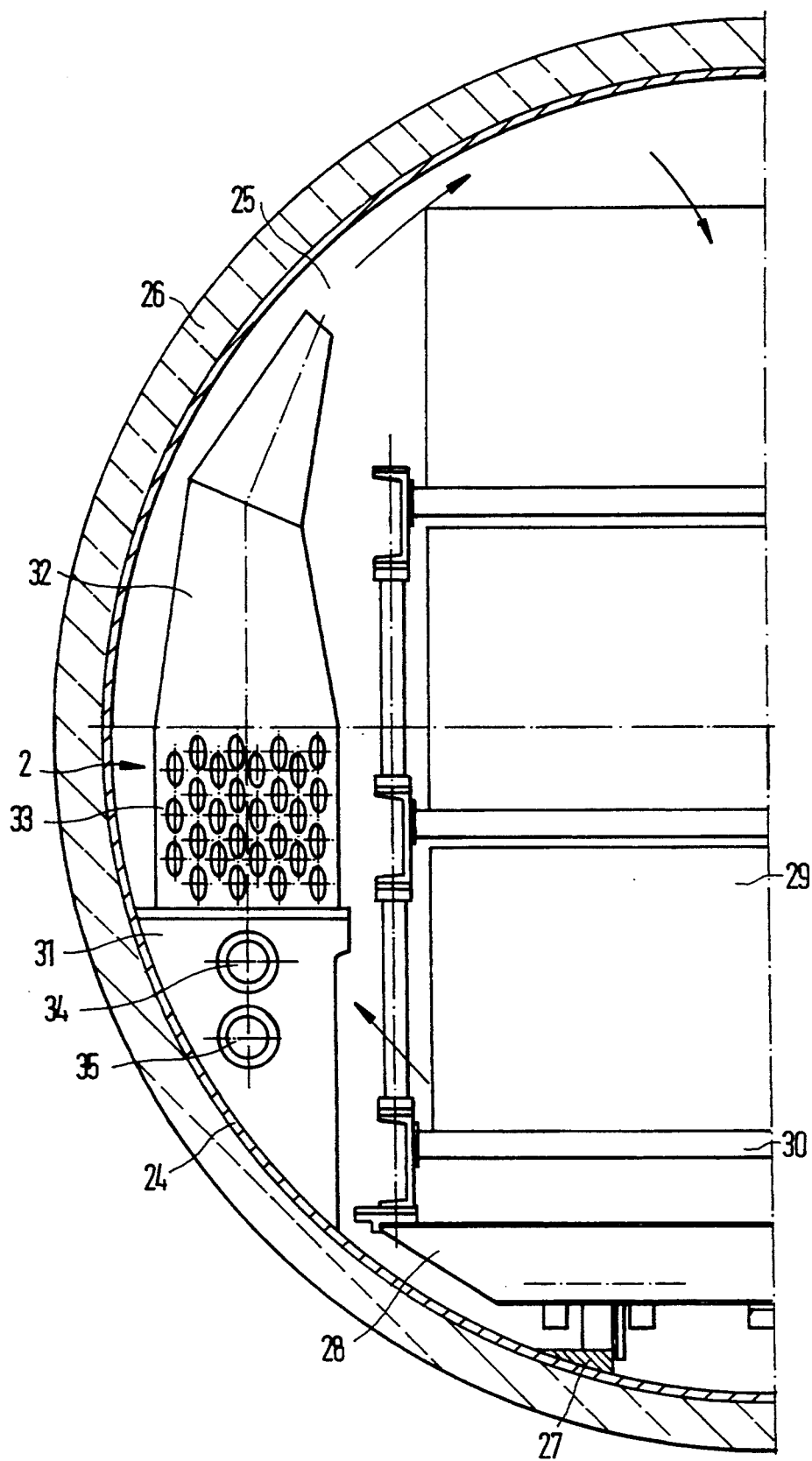
FIG. 3 shows an autoclave schematically and partially, in radial section.

The autoclave plant shown in FIG. 1 comprises six autoclaves 1a to 1f, which can be heated by indirect heating devices 2 arranged in their interiors. The heating devices 2 are each connected on the flow side through a valve 3 to the flow side of a heating oil heater 4 and on the return side to the return line 6 of the heating oil heater 4 equipped with a pump 5. Moreover an auxiliary steam generator 7 is provided, which can be connected through a valve 8 to the heating oil heater 4, in order to generate auxiliary steam, which can be fed through a line 9 and respective valves 10 to any desired autoclave 1a to 1f, via steam lines 11 thereof. The steam lines 11 are further provided with discharge valves 12 and connected together thereby. Moreover a discharge vessel 13 can be provided, which can be connected to any of the autoclaves 1a to 1f through a discharge line 14 and a discharge valve 15.

The autoclave cycle shown in FIG. 2 comprises a heating-up phase 16 of one unit of time of say 2 hours, during which the pressure and the temperature increase, a holding phase 17 of approximately 4 units of time, during which the temperature initially increases still further, then falling back to a substantially constant value and during which the pressure is kept substantially constant by steam discharge, and a relaxing phase 18 of approximately one unit of time, during which the pressure and the temperature are lowered. The pressure and temperature are regulated in this in accordance with the goods to be autoclaved.

When all the autoclaves 1a to 1f are cold, after filling one autoclave 1a it is heated up by means of the auxiliary steam generator 7, driven by the heating oil heater 4. When the heating-up phase of the autoclave 1a is finished, its holding phase follows, during which the drying process is carried out by indirect heating of the steam present in the autoclave 1a and by regulated discharge of steam through its discharge valve 12. This steam is used as a heat transfer medium in order to heat up the next autoclave 1b to be heated. However, the steam given off by the autoclave 1a is not sufficient to be able to effect the complete heating up of the further autoclave 1b, so that the auxiliary steam generator 7 must still supply additional steam. Instead of this, if desired sufficient heat energy can be fed to the autoclave 1a by the heating oil for the steam needed for heating up the autoclave 1b to be generated therein. In the end all the autoclaves 1a to 1f are operating, namely with four autoclaves 1b to 1e in time-displaced regions of their holding and drying phase, the autoclave 1a in the relaxing phase and the last autoclave 1f to be brought in in the heating up phase. The latter is fed with the steam discharged from all the autoclaves 1b to 1f in the holding phase, so that additional steam from the auxiliary steam generator 7 is no longer needed. Rather, the steam generation for heating up the autoclave 1f is effected through the heating oil feed to the indirect heating devices 2 in the autoclaves 1b to 1e and the discharge of steam generated by the drying. When the autoclave 1f is heated up, the autoclave 1a is relieved of pressure, emptied and filled again, so that this can now be heated up by the steam from the autoclaves 1c to 1f, while the autoclave 1b goes into the relaxing phase, etc.

If desired, steam from an autoclave in the relaxing phase can also be used to heat up a further one, up to equalisation of pressures, whereafter the autoclave in the relaxing phase is further relaxed and the other autoclave in the heating up phase is heated up further by steam from other autoclaves in the holding phase.

Figure 4:
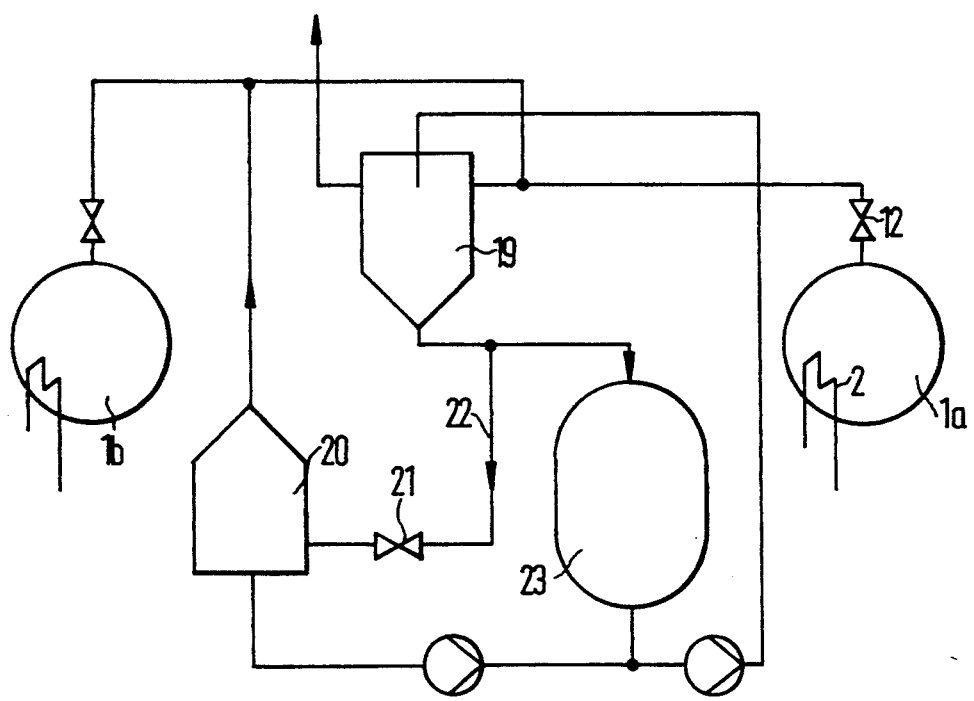
FIG. 4 shows an accumulator arrangement.

The steam used for heating up can be purified in the widest possible meaning of this term before its use as a heat transfer medium; thus dust and/or oil separation, removal of non-condensible gas, removal of the superheat temperature, etc. may be effected, say with the aid of cyclone separators, filters, dephlegmators, mixing preheaters with following pressure-drop steam generators, vapour converters, etc. Thus, the steam given off in the holding phase can as in FIG. 4 be fed to a condenser 19, which discharges non-condensible gas into the air and feeds the condensate to a pressure-drop steam generator 20 through a line 22 provided with a valve 21. The steam generated in the expansion steam generator 20 is then fed to the autoclave to be heated up.

If there are only a few autoclaves or one autoclave, the steam generated in the holding phase can be stored in the interim. This can be of value with frequent running up and running down. According to FIG. 4 the steam discharged in the holding phase and condensed in the condenser 19 can be fed to an intermediate accumulator 23 and be stored until required. A header accumulator or a hot water film accumulator (pressurised or equal pressure store) is suitable as the intermediate accumulator 23.

According to FIG. 3, the autoclave has an autoclave casing 24, which encloses a substantially cylindrical inner chamber 25, is provided at one end or at both ends with a charging opening closed by a cover and has heat insulation 26 outside, in order to keep heat losses as small as possible. In the illustrated embodiment of the autoclave, rails 27 are fitted in the autoclave casing 24 at the bottom, in order to be able to charge the autoclave with trolleys 28, which carry charged materials 29, e.g. moulded bodies of materials containing hardeners to be hardened by vapour, on pallets 30, which are stacked on the trolley 28. In one of the curved regions at the side of the autoclave casing 24, which are in any event not occupied by the charged materials, there is arranged the heating device 2, which is mounted on a bracket 31. The heating device 2 consists of at least one flue 32 arranged substantially vertically and which preferably extends over at least half the height of the autoclave casing 24 and is roughly matched to the curvature of the latter, and a heat exchanger 33, which is arranged in the lower, inflow region of the flue 32 and is connected to a flow line 34 and a return line 35 for heating oil, which can be heated outside the autoclave by means of the heating oil heater 4. Accordingly, as a result of the free convection in operation of the heat exchanger 33 through the flue 32 there is generated a circulating flow in the circumferential direction of the autoclave casing 24, wherewith the saturated vapour or superheated vapour for heating the charged materials 29 and an increase in pressure can be created. The upper outlet opening of the flue 32 is preferably tapered like a nozzle.

If the heating device 2 consists of a plurality of flues 32 with heat exchangers 33 arranged therein, these can be arranged spaced from one another, but preferably on the same side of the autoclave, so that a flow directed downwardly into the middle region of the autoclave results.

Such a heating device 2 is constructionally simple, provides the heat directly and thus in an energetically favourable way in the autoclave, and the inertia is small, since a change in the temperature of the heating oil acts directly in the autoclave and not only through the strong autoclave wall 24 adapted to absorb the internal pressure.

We claim:

1. A method of autoclaving porous bodies containing water during the course of an autoclaving operation, comprising the sequential steps of:

heating an inner chamber of a first autoclave containing the porous bodies with pressurized steam during which heating a temperature level and a pressure level within the inner chamber are increased until predetermined pressure and temperature values are reached;

holding the pressure and temperature values substantially constant for a predetermined time necessary for autoclaving said porous bodies;

during the holding step producing additional steam within the inner chamber of said first autoclave by indirectly heating the inner chamber to an increased temperature level above a vaporization temperature of the water thus vaporizing the water contained in said porous bodies so that the porous bodies are dried, the additional steam being controllably discharged from the inner chamber to maintain the pressure and the temperature values within the inner chamber substantially constant during the holding step while the porous bodies are autoclaved;

using the discharged additional steam from said first autoclave to at least partially heat up a second autoclave operating in a heating step and containing further porous bodies; and lowering the pressure and temperature levels within the inner chamber of said first autoclave for discharging the autoclaved porous bodies.

2. The method according to claim 1, wherein the first and second autoclaves are operated in a steam circuit, the autoclaves having respective autoclaving cycles being offset relative to one another so that steam discharged from at least one of the autoclaves operating in the holding step is fed to at least one of the other autoclaves operating in the heating step.

3. The method according to claim 1, wherein the steam discharged from the inner chamber of said first autoclave during the holding step is stored before it is fed to the second autoclave.

4. The method according to claim 1, wherein the steam discharged from the inner chamber of said first autoclave during the holding step is intermediately stored in a header accumulator before being fed to the second autoclave.

5. The method according to claim 1, wherein the first autoclave is heated convectively during the holding step.

6. The method according to claim 1, wherein a heat source is used to initially heat up the first autoclave during the heating step, the heat source being designed for starting up a single autoclave.

7. The method according to claim 1, wherein the steam discharged from the inner chamber of said first autoclave during the holding step is intermediately stored in a hot water film accumulator before being fed to the second autoclave.

* * * * *